(12) United States Patent
Regnat et al.

(10) Patent No.: US 12,001,819 B2
(45) Date of Patent: Jun. 4, 2024

(54) METHOD, COMPUTER PROGRAM PRODUCT AND MODELING TOOL FOR THE REFERENCE MODEL-BASED, REQUIREMENT-BASED DEVELOPMENT OF A TECHNICAL SYSTEM

(71) Applicant: Siemens Aktiengesellschaft, Munich (DE)

(72) Inventors: Nikolaus Regnat, Munich (DE); Sieglinde Kranz, Germering (DE)

(73) Assignee: Siemens Aktiengesellschaft, Munich (DE)

(*) Notice: Subject to any disclaimer, the term of this patent is extended or adjusted under 35 U.S.C. 154(b) by 149 days.

(21) Appl. No.: 17/544,114

(22) Filed: Dec. 7, 2021

(65) Prior Publication Data

US 2022/0197605 A1 Jun. 23, 2022

(30) Foreign Application Priority Data

Dec. 21, 2020 (EP) .................................. 20216040

(51) Int. Cl.
| | |
|---|---|
| *G06F 8/35* | (2018.01) |
| *G06F 8/10* | (2018.01) |
| *G06F 8/73* | (2018.01) |
| *G06F 30/20* | (2020.01) |

(52) U.S. Cl.
CPC ............. *G06F 8/35* (2013.01); *G06F 8/10* (2013.01); *G06F 8/73* (2013.01); *G06F 30/20* (2020.01)

(58) Field of Classification Search
CPC ... G06F 8/10; G06F 8/35; G06F 30/20; G06F 30/25; G06F 30/27; G06F 30/28

USPC ........................................ 717/100, 104, 105
See application file for complete search history.

(56) References Cited

FOREIGN PATENT DOCUMENTS

| | | | | |
|---|---|---|---|---|
| EP | 3671374 A1 | * | 6/2020 | ............... G01W 1/10 |
| EP | 3699704 A1 | * | 8/2020 | ........ G05B 19/41885 |

OTHER PUBLICATIONS

Moyne, James, et al., A Requirements Driven Digital Twin Framework: Specification and Opportunities, IEEE Access (vol. 8), 2020, 21 pages, [retrieved on Dec. 11, 2023], Retrieved from the Internet: <URL:http:/ieeexplore.ieee.org/>.*

Dassault Systèmes: "Abaqus 6.14—Abaqus/CAE User's Guide"; Jan. 1, 2014; pp. 1-1146; XP055807547; URL: http://130.149.89.49:2080/v6.14/pdf_books/CAE.pdf [retrieved on May 26, 2021]; 2014.

(Continued)

*Primary Examiner* — Geoffrey R St Leger
(74) *Attorney, Agent, or Firm* — Schmeiser, Olsen & Watts, LLP (57) ABSTRACT

A method, computer program product and modelling tool for a reference model requirement based development of a technical system is ascertained, (i) in a first orchestration phase, to ascertain a storage location in the digital twin for the suitable reference model requirement, (ii) in a second orchestration phase, to ascertain a relevance of the reference model requirement belonging to the storage location and relevant to the forwarding from different perspectives for the development of the technical system, and (iii) in a third orchestration phase, to extract the reference model requirement from the ascertained relevance.

7 Claims, 5 Drawing Sheets

(56) References Cited

OTHER PUBLICATIONS

Bosch IOT Suite: "Digital Twin"; Aug. 6, 2020; pp. 1-7; XP055807552; URL: https://web.archive.org/web/20200806181408/https://docs.bosch-iotsuite.com/things/getting-started/twin/ [retrieved on May 26, 2021]; 2020.

Wright, Louise et al: "How to tell the difference between a model and a digital twin"; Advanced Modeling and Simulation in Engineering Sciences; Biomed Central Ltd; London, UK; vol. 7; No. 1; Mar. 11, 2020; pp. 1-13; XP021273689; DOI: 10.1186/S40323-020-00147-4; 2020.

\* cited by examiner

METHOD, COMPUTER PROGRAM PRODUCT AND MODELING TOOL FOR THE REFERENCE MODEL-BASED, REQUIREMENT-BASED DEVELOPMENT OF A TECHNICAL SYSTEM

CROSS-REFERENCE TO RELATED APPLICATIONS

This application claims priority to EP Application No. 20216040.4, having a filing date of Dec. 21, 2020, the entire contents of which are hereby incorporated by reference.

FIELD OF TECHNOLOGY

The following relates to a method for the reference model-based, requirement-based development of a technical system, to a computer program product for the reference model-based, requirement-based development of a technical system, and to a modeling tool for the reference model-based, requirement-based development of a technical system.

BACKGROUND

When developing complex systems of complex systems in different technical fields, hereinafter referred to as technical system, it is conventional for example for subsystems of these technical systems to be developed by other organizational units or external suppliers. To this end, it is necessary to define corresponding specifications or requirements for these subsystems. If model-based methods are used for the development, it is expedient to use pre-existing, that is to say pre-developed, systems from the same or comparable technical fields and of different or comparable complexity, including their system components, many of which are contained in the pre-existing systems and contribute to functions of the pre-existing systems, and to use their complex reference models, which contain such specifications or requirements, to develop the technical systems such that the specifications or requirements are able to be forwarded.

Such systems are referred to hereinafter as technical reference systems, and their system components are referred to as reference system components.

The technical fields mentioned may be any technical fields. A non-exhaustive list is thus for example:

Automation engineering, energy technology, communication technology, medical technology, vehicle technology concerning road vehicles, rail vehicles, watercraft, or aircraft.

The specifications or requirements contained in the complex reference models contain either statements about required properties and capabilities of the reference system components that these have to meet in order to comply with text-based document specifications, standards and/or specifications and provide certain performances, or statements about required properties and capabilities of the reference system that this has to meet in order to comply with text-based document specifications, standards and/or specifications and provide certain performances.

The complex reference models represent the respective technical reference system in digital form and are accordingly referred to as digital twins. Each digital twin of a technical reference system storing the complex reference model of this system represents the corresponding reference system in digital form.

However, forwarding the specifications or requirements contained in the complex reference models is able to be achieved only with great difficulty or with a high degree of effort, since there are no automated methods for selecting and forwarding the specifications or requirements that are necessary for a particular subsystem of the technical systems in a targeted manner. Furthermore, the receiver of the specifications or requirements has to be capable of simultaneously obtaining specifications or requirements from different senders in order to be able to develop a suitable subsystem. In this case, it is crucial for the receiver to be able to identify synergies between the various specifications or requirements.

Previous solutions do not solve this problem or solve it only in part. Usually, either text-based specifications or requirements are created or specific specification/requirement models are created manually and are then forwarded. This leads to a high degree of effort for the creator (sender) of the specifications or requirements, and additionally often leads to problems with understanding for the receiver of the specifications or requirements. Comparing the different text-based specifications or requirements at the receiver additionally entails a high degree of effort.

SUMMARY

An aspect relates to that of specifying a method, a computer program product (non-transitory computer readable storage medium having instructions, which when executed by a processor, perform actions) and a modeling tool for the reference model-based, requirement-based development of a technical system, in which a requirement for a system component of the technical system to be developed is ascertained automatically on the basis of a reference model.

The idea on which embodiments of the invention are based is that by a) accessing a stored digital twin as complex reference model and digital representation of a technical reference system containing a plurality of reference system components each contributing to the functioning of the technical reference system, it is possible to forward reference model requirements for the development of the technical system that contain the following statements about required properties and capabilities of the reference system components that these have to meet in order to comply with text-based document specifications, standards and/or specifications and provide certain performances, or statements about required properties and capabilities of the reference system that this has to meet in order to comply with text-based document specifications, standards and/or specifications and provide certain performances, b) computer-aided access orchestration, in which access is orchestrated by way of user-based data and command input and logic-based data processing and command implementation in accordance with a stipulation based on a set of rules, and, for a dedicated system component provided for the development of the technical system, in particular through user selection, which contributes to the functioning of the technical system, with a dedicated requirement, provided in particular through user selection, in relation to the reference system containing the reference system components, a reference model requirement, suitable for this purpose, from the forwardable reference model requirements is ascertained, b1) in a first orchestration phase, a storage location in the digital twin is ascertained for the reference model requirement suitable for the development of the technical system, b2) in a second orchestration phase, a relevance of the reference model requirement belonging to the storage location and relevant to the forwarding is ascertained from different perspectives for the development of the technical system, b3) in a third orchestration phase, the reference model requirement is extracted from the ascertained relevance.

In contrast to known solutions, using the procedure proposed above, it is considerably easier, for a dedicated system component provided for the development of the technical system with a provided dedicated requirement, to ascertain and to forward a specification or requirement, suitable for this purpose, of a reference model.

The method is highly advantageous for the sender of the specifications, since existing development models, such as the complex reference model, are used and a specification model is able to be generated automatically therefrom for the dedicated system component with the dedicated requirement for the development of the technical system. The receiver of such specification models receives far more formal specifications using this method, these also being able to be easily compared. The receiver is also able to reference a plurality of specification models in order to create a solution that is optimum for him by identifying synergies.

BRIEF DESCRIPTION

Some of the embodiments will be described in detail, with reference to the following figures, wherein like designations denote like members, wherein.

DETAILED DESCRIPTION

Figure 1:
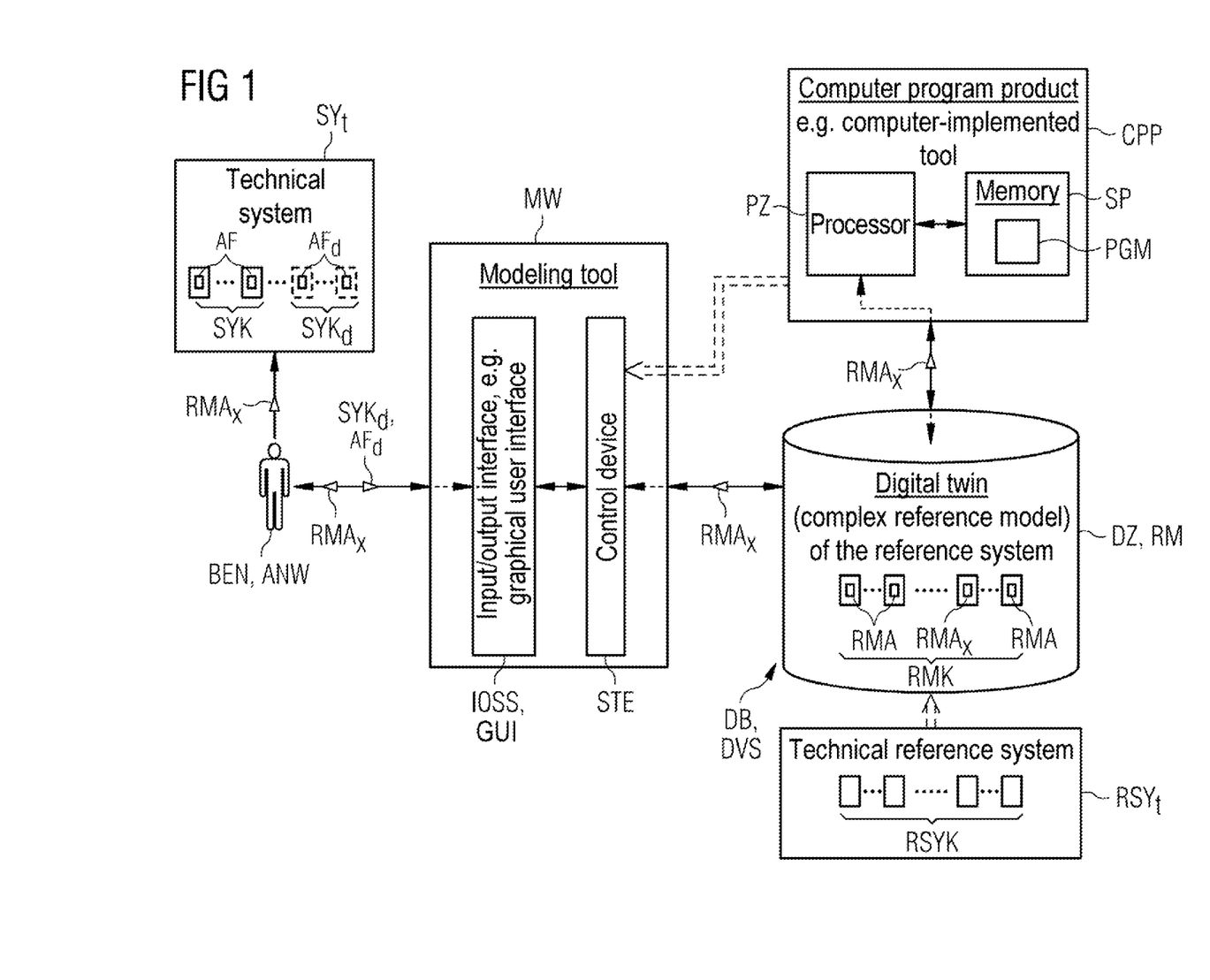
FIG. 1 shows a scenario for the reference model-based, requirement-based development of a technical system.

FIG. 1 shows a scenario for the reference model-based, requirement-based development of a technical system $SY_t$. In the finally developed state, such a technical system $SY_t$ contains a multiplicity of system components SYK that constitute subsystems of the technical system $SY_t$ and each contribute to the functioning of the technical system $SY_t$. The system components SYK are assigned or allocated requirements AF that in each case contain either statements about required properties and capabilities of the system components SYK that these have to meet in order to comply with text-based document specifications, standards and/or specifications and provide certain performances, or statements about required properties and capabilities of the technical system $SY_t$ that this has to meet in order to comply with text-based document specifications, standards and/or specifications and provide certain performances.

The technical system $SY_t$ illustrated in FIG. 1 is however not yet fully developed, this being shown by the system components or subsystems illustrated in dashed form. There is thus a dedicated system component $SYK_d$, provided for the development of technical system $SY_t$, that, like the other system components, also contributes to the functioning of the technical system $SY_t$ and that is assigned or allocated a dedicated requirement $AF_d$ containing said properties. The development of the technical system $SY_t$ provided in this regard is intended to take place, according to embodiments of the invention, in a reference model-based manner, this being explained hereinafter and below in the context of the description of FIG. 2.

The technical system $SY_t$ is an object in a "physical world" and may be, in accordance with the definition of technical fields given at the outset, for example, in the medical technology sector, a computed tomography apparatus or a magnetic resonance tomography apparatus or, in the energy technology sector, a wind turbine or, in the vehicle technology sector, a passenger vehicle (automobile). The dedicated system component or the dedicated subsystem $SYK_d$ that is provided for the development of the technical system $SY_t$ could accordingly for example, in the medical technology sector, be a detector or, in the energy technology sector, be a generator or, in the vehicle technology sector, be a motor.

Further objects in the "physical world" in accordance with the illustrated scenario for the reference model-based, component-based development of the technical system $SY_t$ are a technical reference system $RSY_t$ containing a plurality of reference system components RSYK that also again each contribute to the functioning of the technical reference system $RSY_t$, and a modeling tool MW for the model-based development of complex technical systems, this being in the form of a workplace computer (workstation) or personal computer.

In this respect, both of them are the link to a "digital world" as the technical reference system $RSY_t$ containing the reference system components RSYK, which is identical or comparable in relation to the technical fields containing the technical system $SY_t$ and may be different or comparable in relation to system complexity, is represented in digital form by a digital twin DZ, stored in a database DB or in a data processing system DVS and belonging to the "digital world" as complex reference model RM of the technical reference system $RSY_t$, and the modeling tool MW is able to forward reference model requirements RMA from reference model components RMK for the development of the technical system $SY_t$ through access to the digital twin DZ and, for this purpose, a suitable reference model requirement $RMA_x$ is determined, for example through selection or choosing.

In order to be able to forward this suitable reference model requirement $RMA_x$, the modeling tool MW has a control device STE and an input/output interface IOSS, connected to the control device STE and in the form of a graphical user interface GUI, for user inputs and outputs of a user BEN or operator ANW of the modeling tool MW.

The control device STE is connected to the database DB or the data processing system DVS for the development of the technical system $SY_t$ and access to the digital twin DZ.

The forwarding of the reference model requirement $RMA_x$ is however performed neither by the modeling tool MW nor by the control device STE as such, but rather the forwarding is part of a further digital component in the "digital world". This digital component is a computer program product CPP for the reference model-based, requirement-based development of the technical system $SY_t$, which is designed as a computer-implemented tool and constitutes application software—also referred to as "APP".

The computer program product CPP furthermore has a non-volatile readable memory SP in which processor-readable control program commands of a program module PGM for the reference model-based, requirement-based development of the technical system $SY_t$ are stored, and a processor PZ, connected to the memory SP, that executes the control program commands of the program module PGM for the system development and, in this context, ascertains the reference model requirement $RMA_x$ by extracting the reference model requirement $RMA_x$ from the reference model requirements RMA.

This computer program product CPP, the computer-implemented tool or the "APP" is able to be loaded into the control device STE for the reference model-based, requirement-based development of the technical system $SY_t$ [this is illustrated in FIG. 1 by the dashed double arrow (double-headed arrow)] and may be developed and operated independently of the modeling tool MW.

How the reference model-based, component-based development of the technical system $SY_t$ and, in the context thereof, the forwarding of the reference model requirement $RMA_x$ in accordance with the illustrated scenario functions and runs and is performed in the modeling tool MW and in the computer program product CPP is now explained with reference to FIG. 2.

Figures 2, 2A:
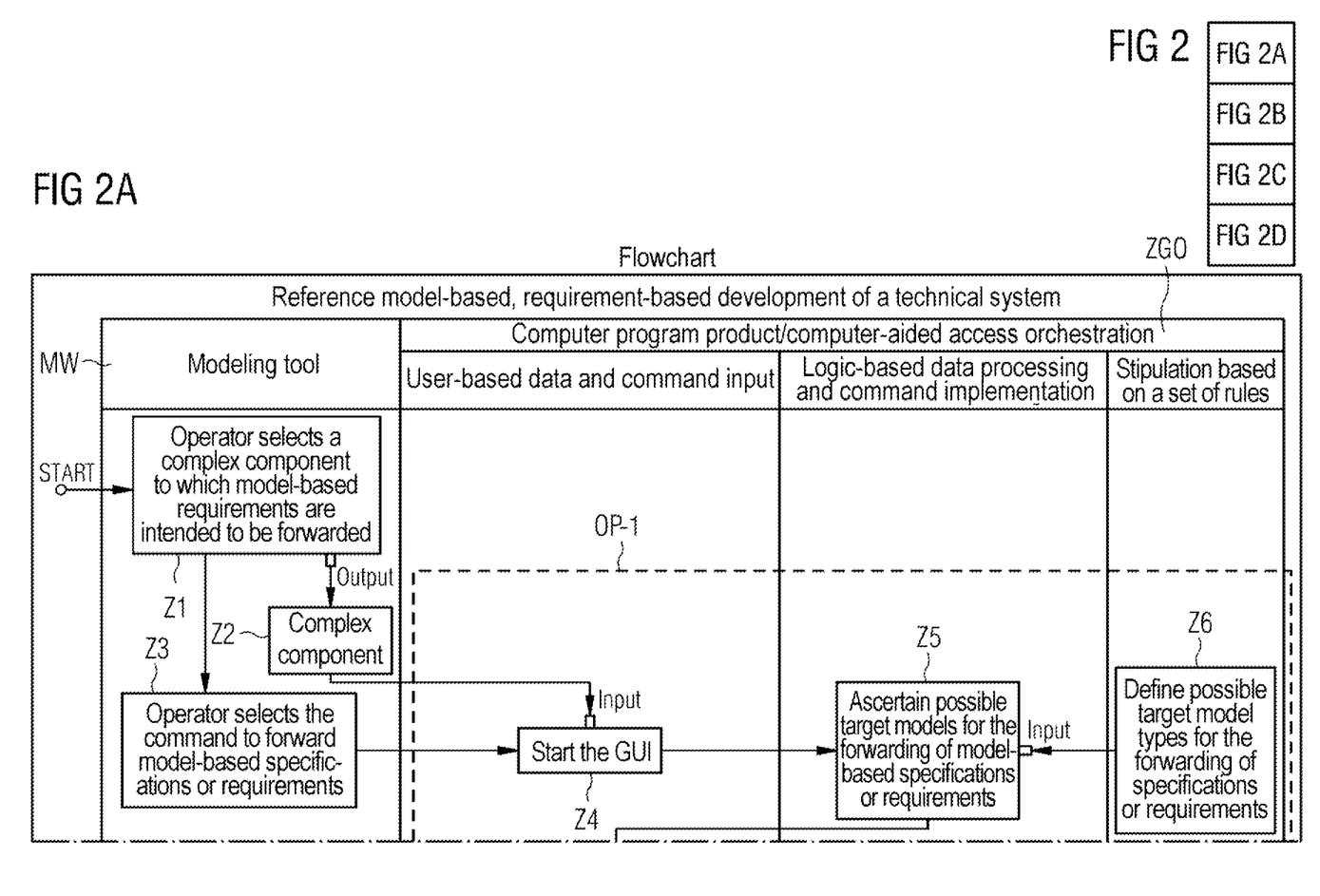
FIG. 2 shows a flowchart of the reference model-based, requirement-based development of the technical system in accordance with the scenario illustrated in FIG. 1.
FIG. 2A shows a flowchart of the reference model-based, requirement-based development of the technical system in accordance with the scenario illustrated in FIG. 1.
Figure 2B:
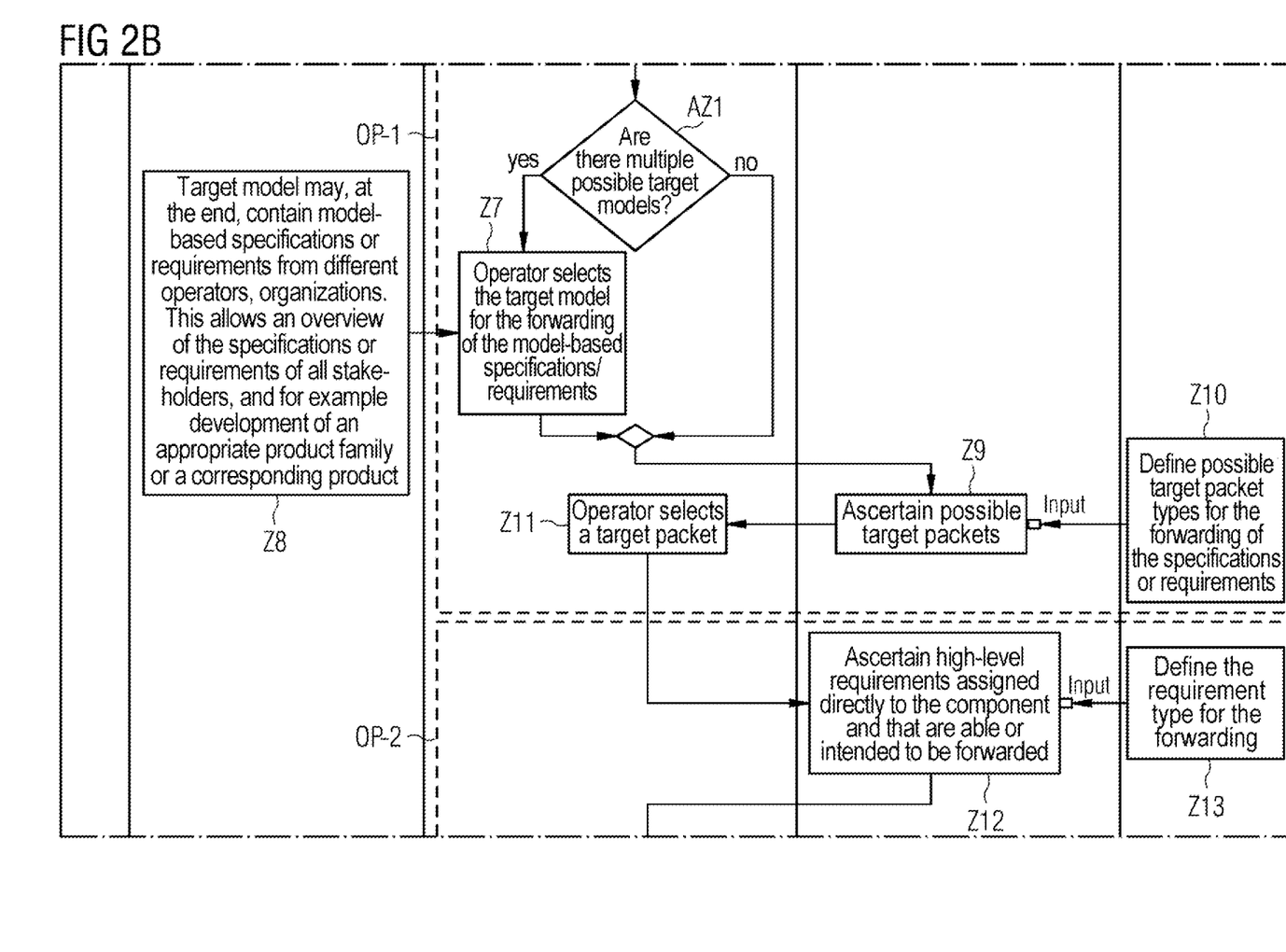
FIG. 2B shows a flowchart of the reference model-based, requirement-based development of the technical system in accordance with the scenario illustrated in FIG. 1.
Figure 2C:
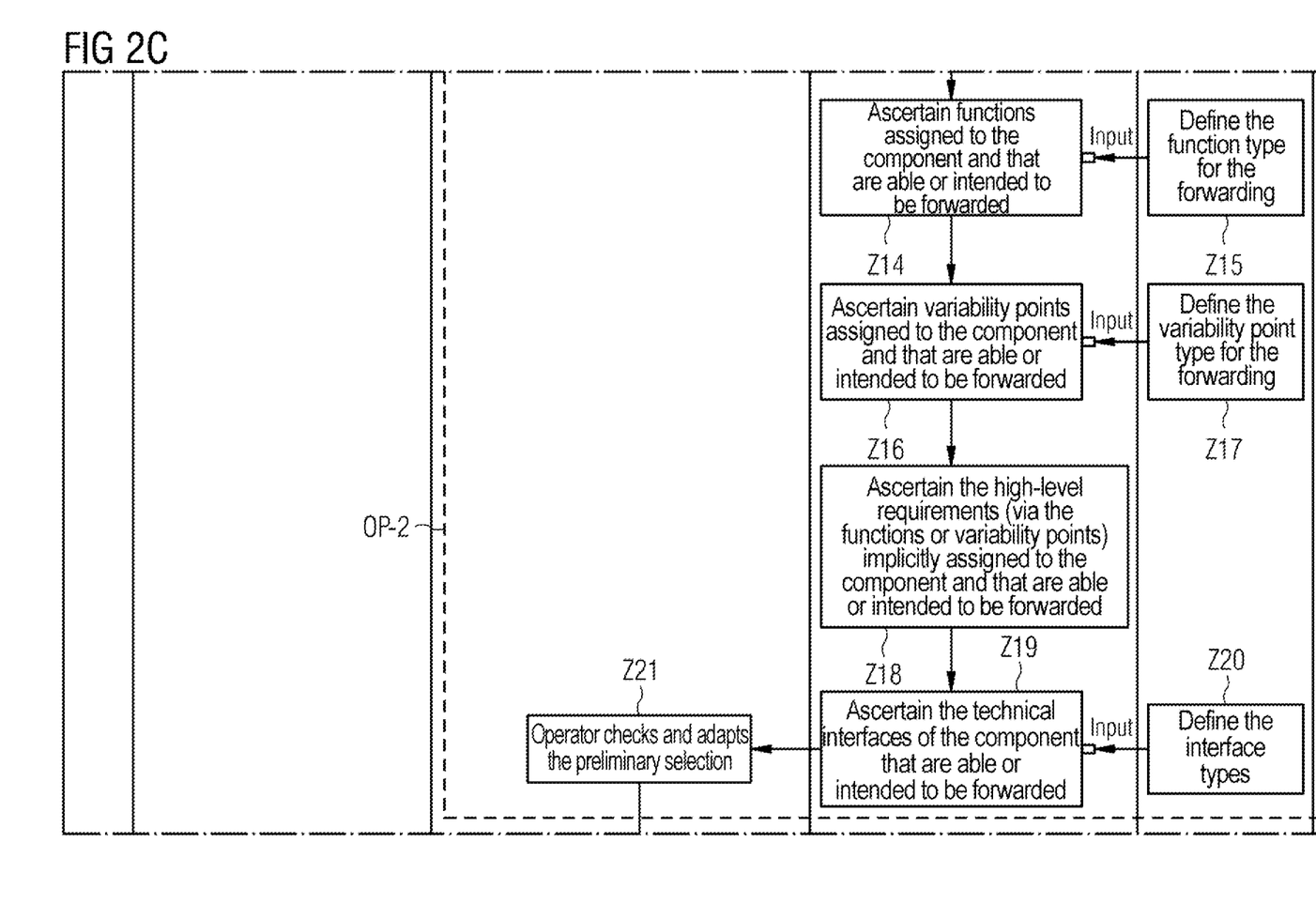
FIG. 2C shows a flowchart of the reference model-based, requirement-based development of the technical system in accordance with the scenario illustrated in FIG. 1.
Figure 2D:
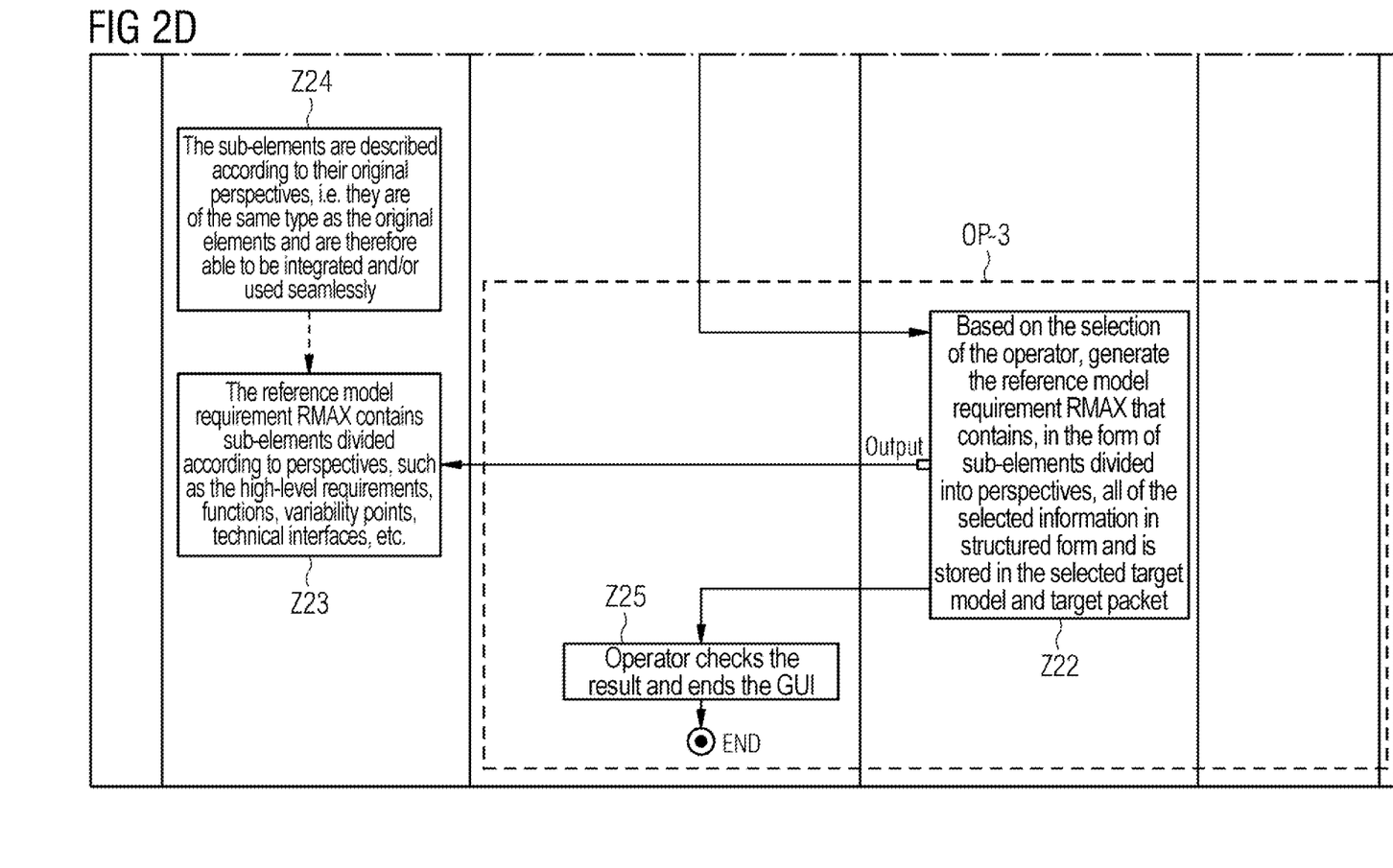
FIG. 2D shows a flowchart of the reference model-based, requirement-based development of the technical system in accordance with the scenario illustrated in FIG. 1.

FIG. 2 shows a flowchart of the reference model-based, requirement-based development of the technical system $SY_t$ according to the scenario illustrated in FIG. 1. According to this flowchart, the development of the technical system $SY_t$ in the context of the forwarding of the reference model requirement $RMA_x$ is substantially orchestrated by access orchestration ZGO, in which, in accordance with the scenario and aided by the computer program product CPP or in a computer-aided manner, access to the digital twin DZ is orchestrated in order to forward the suitable reference model requirement $RMA_x$ from the forwardable reference model requirements RMA of digital twin DZ.

The access orchestration ZGO, according to which each access operation with user-based data and command input and logic-based data processing and command implementation is orchestrated in accordance with a stipulation based on a set of rules, is divided, in accordance with the flowchart illustrated in FIG. 2, into three orchestration phases, a first orchestration phase OP-1, a second orchestration phase OP-2 and a third orchestration phase OP-3.

In accordance with a stipulation based on a set of rules in this case means that rules decisively define what information, for example aspects of the reference model or the digital twin, are relevant to the development of a component of the system $SY_t$. Based on these rules, it is thus identified what information has to be forwarded for the development of the system components and what information can be omitted. The rules furthermore define the way in which information is intended to be transformed or converted.

According to the flowchart, the system development starts, in a first state Z1, with the operator ANW or user BEN, according to FIG. 1, using the modeling tool MW for a component of the system $SY_t$, for example the dedicated system component $SYK_d$, to select a complex component of the reference model, for example one of the reference model components RMK shown in FIG. 1, to which reference model requirements allocated to the reference model components RMK should be forwarded for the system development. In this case, in a second state Z2, the complex component for the forwarding is specified and, in a third state Z3, the operator ANW or user BEN selects a command to forward model-based specifications or requirements, for example the reference model requirements.

Requirements are specifications for system development. These are usually text and may be of both functional and non-functional nature.

Example: After the component is started up, it has to be ready for operation (non-functional) within 3 seconds. The component has to be capable of being able to use human speech inputs to be controlled (functional).

Such requirements may be allocated directly to the component, in this case state a rule whereby the directly allocated requirements should be forwarded.

This is the transition from the modeling tool MW to the first orchestration phase OP-1 of the access orchestration ZGO aided or computer-aided by the computer program product CPP. In this case, in the course of the user-based data and command input in the access orchestration ZGO, the graphical user interface GUI is initially started in a fourth state Z4.

Based on the specified complex component (cf. state Z2) and the command selection (cf. state Z3), in the first orchestration phase OP-1, which involves ascertaining a storage location in the digital twin DZ for the reference model requirement $RMA_x$ suitable for the development of the technical system $SY_t$, in a fifth state Z5 in the course of the logic-based data processing and command implementation in the access orchestration ZGO, possible target models for the forwarding of model-based specifications or requirements, for example the reference model requirements, are ascertained.

A target model refers purely to the storage location in the database DB or in the data processing system DVS where the reference model requirement is intended to be provided for forwarding. This may thus for example be the database DB that serves for example as library (target library) with a defined substructure as packet (target packet).

For this ascertaining of the storage location, in the course of the rule-based stipulation, in the access orchestration ZGO, in a sixth state Z6, possible target model types for the forwarding of specifications or requirements are defined.

If the possible target models are ascertained (cf. state Z5) then it is queried, in a first query state AZ1 in the course of the user-based data and command input in the access orchestration ZGO, whether there are multiple possible target models. In the event of the query result "YES", in the course of the user-based data and command input, in the access orchestration ZGO, in a seventh state Z7, a target model for the forwarding of the model-based specifications or requirements, for example the reference model requirements, is selected by the operator ANW or user BEN and there is then a direct transition to a ninth state Z9 with the system development sequence, whereas, in the event of the query result "NO", there is a direct transition to the ninth state Z9 with the system development sequence.

For this target model selection made by the operator ANW or user BEN in the seventh state Z7, in the course of access via the modeling tool MW according to an eighth state Z8 may also mean that the target model selection contains model-based specifications or requirements from different operators or users, for example organizations. This allows an overview of (i) all of the model-based specifications or requirements of all people (for example stakeholders) and (ii) for example development of an appropriate product family or a corresponding product.

In the ninth state Z9, in the course of the logic-based data processing and command implementation, in the access orchestration ZGO, possible target packets are ascertained. To explain what a target packet is, reference is made to the explanations with regard to "target model" (cf. explanations above with regard to state Z5).

For this ascertaining of the possible target packets in the course of graduated ascertaining of the storage location (1st stage relates to ascertaining the possible target models and 2nd stage relates to ascertaining the possible target packets), in the course of the rule-based stipulation, in the access orchestration ZGO, in a tenth state Z10, possible target packet types for the forwarding of specifications or requirements are defined.

To complete the first orchestration phase OP-1, in an eleventh state Z11, in the course of the user-based data and command input in the access orchestration ZGO, a target packet is selected from the possible target packets by the operator ANW or user BEN.

When the target packet is selected and the storage location is thus ascertained, in the access orchestration ZGO, the transition from the first orchestration phase OP-1 to the second orchestration phase OP-2 takes place.

According to the second orchestration phase OP-2 in the access orchestration ZGO, a relevance of the reference model requirement $RMA_x$ belonging to the storage location and relevant to the forwarding is ascertained from different perspectives for the development of the technical system $SY_t$.

The starting point for this is after the transition from the first orchestration phase OP-1 from the eleventh state Z11 to the second orchestration phase OP-2 to a twelfth state Z12. In this twelfth state Z12, in the course of the logic-based data processing and command implementation in the access orchestration ZGO, high-level reference model requirements are ascertained, these being allocated directly to the reference model components RMK and being able to be forwarded.

It is pointed out once again at this juncture that requirements are specifications for system development. These are usually text and may be of both functional and non-functional nature. Example: After the component is started up, it has to be ready for operation (non-functional) within 3 seconds. The component has to be capable of being able to use human speech inputs to be controlled (functional).

Such requirements may be allocated directly to the component, in this case state a rule whereby the directly allocated requirements should be forwarded.

For this ascertaining of the high-level reference model requirements, in the course of the rule-based stipulation, in the access orchestration ZGO, in a thirteenth state Z13, possible requirement types for the forwarding are defined.

Following the ascertaining of the high-level reference model demands, in a fourteenth state Z14, in the course of the logic-based data processing and command implementation in the access orchestration ZGO, functions are ascertained, these being allocated directly to the reference model components RMK and being able to be forwarded.

Functions describe the implementation of functional requirements. A function is in this case characterized by at least one input, processing and at least one output. Example: A "speech recognition" function is defined. Its input is an audio signal (for example a human voice) and its output is the recognized speech in text form. A component is usually characterized by a number of functions that are related to one another. Such functions may be allocated directly to the component, in this case state a rule whereby the directly allocated functions should be forwarded.

For this ascertaining of the functions, in the course of the rule-based stipulation in the access orchestration ZGO, in a fifteenth state Z15, possible function types for the forwarding are defined.

Following the ascertaining of the functions, in a sixteenth state Z16, in the course of the logic-based data processing and command implementation in the access orchestration ZGO, variability models are ascertained, these being allocated directly to the reference model components RMK and being able to be forwarded.

Variability points describe features in which various designs of a component may differ. This may be based for example on functional or non-functional requirements. Example: To support different markets, a high-price and a low-price version of the component is desirable. This is a non-functional requirement. To achieve this, a variability point "housing material" is for example defined. The component may accordingly be supplied with a stainless steel housing, for example an expensive one, for the premium market, or with a plastic housing, for example an inexpensive one, for the budget market.

A rule then states that such variability points that have been allocated to the component are able to be forwarded.

For this ascertaining of the variability points, in the course of the rule-based stipulation in the access orchestration ZGO, in a seventeenth state Z17, possible variability point types for the forwarding are defined.

In addition to ascertaining the variability points, in an eighteenth state Z18, in the course of the logic-based data processing and command implementation, in the access orchestration ZGO, the high-level reference model requirements that are allocated implicitly to the reference model components RMK, via the functions or the variability points, and are able to be forwarded are ascertained, before, in a nineteenth state Z19, in the course of the logic-based data processing and command implementation, in the access orchestration ZGO, technical interfaces of the reference model component $RMK_x$ that are able to be forwarded are ascertained.

Implicitly allocated requirements are those that have not been allocated directly to the component by the operator, but rather that act indirectly on the component. Example: A non-functional requirement is allocated to a function, for example "the speech recognition must be 90% reliable" is allocated to the function "speech recognition". In order that this information is not lost, this non-functional requirement must likewise be forwarded. This is defined by a rule.

A rule additionally defines that at least those interfaces that are "externally" visible are forwarded. This is because these interfaces are thus a "requirement" on the component. Interfaces are in this case of a technical nature, for example a "Universal Serial Bus <USB>" interface.

To ascertain the technical interfaces, in the nineteenth state Z19, in the course of the rule-based stipulation, in the access orchestration ZGO, in a twentieth state Z20, technical interface types are defined.

When preliminary selections made by the user or operator in the course of the user-based data and command input in the access orchestration ZGO are checked and adjusted by the operator ANW or user BEN and to complete the second orchestration phase OP-2 in a twenty-first state Z21, the transition from the second orchestration phase OP-2 to the third orchestration phase OP-3 takes place.

In the third orchestration phase OP-3 in the access orchestration ZGO, the reference model requirement $RMA_x$ is extracted from the ascertained relevance.

The starting point for this is after the transition from the second orchestration phase OP-2 in the twenty-first state Z21 to the third orchestration phase OP-3 in a twenty-second state Z22. In this twenty-second state Z22, in the course of the user-based data and command input in the access orchestration ZGO, based on the preliminary selection by the operator ANW or user BEN in the state Z21, the reference model requirement $RMA_x$, which contains all of the selected information from the second orchestration phase OP-2 in structured form in the form of sub-elements divided according to perspectives, is generated and stored in the selected target model and target packet.

Following the generation of the reference model requirement $RMA_x$ and the storage thereof in the selected target model and target packet, this is ready for forwarding and is transferred, for this purpose, in a twenty-third state Z23, to the modeling tool MW. The reference model component $RMA_x$ for this purpose contains sub-elements divided according to perspectives, such as the high-level reference model requirements, the functions, the variability points and the technical interfaces.

According to a twenty-fourth state Z24 in relation to the modeling tool MW with the reference model component $RMK_x$ transferred there, these sub-elements are described in accordance with their original perspectives, that is to say they are of the same type as the original elements and are therefore able to be integrated and/or used seamlessly.

To complete the access orchestration ZGO, the third orchestration phase OP-3 and to end the flowchart, in a twenty-fifth state Z25, in the course of the user-based data and command input by the operator ANW or user BEN, the result of the access orchestration ZGO is checked and the graphical user interface GUI is closed and ended.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for reference model-based, requirement-based development of a technical system, comprising:
   providing a technical reference system containing a plurality of reference system components that each contribute to the functioning of the technical reference system and are represented in digital form by a stored digital twin as a complex reference model of the technical reference system, wherein reference model requirements of reference model components for the development of the technical system are able to be forwarded by accessing the digital twin, the reference model requirements containing
   statements about required properties and capabilities of the reference system components that the reference system components have to meet in order to comply with text-based document specifications, standards and/or specifications and provide certain performances, or containing statements about required properties and capabilities of the technical reference system that the technical reference system has to meet in order to comply with text-based document specifications, standards and/or specifications and provide certain performances,
   a) performing computer-aided orchestration of access to the digital twin in order to forward a suitable reference model requirement from the forwardable reference model requirements of the digital twin, in which
   access is orchestrated by way of user-based data and command input and logic-based data processing and command implementation in accordance with a stipulation based on a set of rules, and for a dedicated system component provided for the development of the technical system, which contributes to the functioning of the technical system, with a dedicated requirement, which is allocated to the dedicated system component, in relation to the technical reference system containing the reference system components, the suitable reference model requirement from the forwardable reference model requirements is ascertained, by way of which
   a1) in a first orchestration phase, a storage location in the digital twin is ascertained for the suitable reference model requirement suitable for the development of the technical system,
   a2) in a second orchestration phase, a relevance of the suitable reference model requirement belonging to the storage location and relevant to the forwarding is ascertained from different perspectives for the development of the technical system, and
   a3) in a third orchestration phase, the suitable reference model requirement is extracted from the storage location in accordance with the ascertained relevance, and
   b) forwarding the extracted suitable reference model requirement.

2. The method as claimed in claim 1, wherein
the storage location for the suitable reference model requirement is ascertained through graduated ascertaining of a target model of the suitable reference model requirement and then of a target packet as substructure of the target model of the suitable reference model requirement in relation to the relevance.

3. The method as claimed in claim 2, wherein
the relevance of the suitable reference model requirement belonging to the storage location and decisive for the forwarding for the development of the technical system is ascertained from different perspectives by
ascertaining high-level reference model requirements that are allocated directly to the reference model components and are able to be forwarded,
ascertaining functions that are allocated directly to the reference model components and are able to be forwarded,
ascertaining variability points that are allocated directly to the reference model components and are able to be forwarded,
ascertaining the high-level reference model requirements that are allocated implicitly to the reference model components via the functions or the variability points and are able to be forwarded, and ascertaining technical interfaces of the reference model components that are able to be forwarded.

4. A computer program product, comprising a non-transitory computer readable hardware storage device having computer readable program code stored therein, said program code executable by a processor of a computer system to implement a method, for reference model-based, requirement-based development of a technical system, wherein, in relation to a technical reference system containing a plurality of reference system components that each contribute to the functioning of the technical reference system and are represented in digital form by a stored digital twin as a complex reference model of the technical reference system, reference model requirements of reference model components for the development of the technical system are able to be forwarded by accessing the digital twin, the reference model requirements containing statements about required properties and capabilities of the reference system components that the reference system components have to meet in order to comply with text-based document specifications, standards and/or specifications and provide certain performances, or containing statements about required properties and capabilities of the technical reference system that the technical reference system has to meet in order to comply with text-based document specifications, standards and/or specifications and provide certain performances, wherein the program code is configured to a) orchestrate access to the digital twin in order to forward a suitable reference model requirement from the forwardable reference model requirements of the digital twin, in which access is orchestrated by way of user-based data and command input and logic-based data processing and command implementation in accordance with a stipulation based on a set of rules, and for a dedicated system component provided for the development of the technical system, which contributes to the functioning of the technical system, with a dedicated requirement, which is allocated to the dedicated system component, in relation to the technical reference system containing the reference system components, the suitable reference model requirement from the forwardable reference model requirements is ascertained, a1) in a first orchestration phase, a storage location in the digital twin is ascertained for the suitable reference model requirement suitable for the development of the technical system, a2) in a second orchestration phase, a relevance of the suitable reference model requirement belonging to the storage location and relevant to the forwarding is ascertained from different perspectives for the development of the technical system, a3) in a third orchestration phase, the suitable reference model requirement is extracted from the storage location in accordance with the ascertained relevance, and b) forward the extracted suitable reference model requirement.

5. The computer program product as claimed in claim 4, wherein the program code is configured such that the storage location for the suitable reference model requirement is ascertained through graduated ascertaining of a target model of the suitable reference model requirement and then of a target packet as substructure of the target model of the suitable reference model requirement in relation to the relevance.

6. The computer program product as claimed in claim 5, wherein the program code is configured such that the relevance of the suitable reference model requirement belonging to the storage location and decisive for the forwarding for the development of the technical system is ascertained from different perspectives by ascertaining high-level reference model requirements that are allocated directly to the reference model components and are able to be forwarded, ascertaining functions that are allocated directly to the reference model components and are able to be forwarded, ascertaining variability points that are allocated directly to the reference model components and are able to be forwarded, ascertaining the high-level reference model requirements that are allocated implicitly to the reference model components via the functions or the variability points and are able to be forwarded, and ascertaining technical interfaces of the reference model components that are able to be forwarded.

7. A modeling tool for reference model-based, requirement-based development of a technical system, in which, in relation to a technical reference system containing a plurality of reference system components that each contribute to the functioning of the technical reference system and are represented in digital form by a stored digital twin as a complex reference model of the technical reference system, reference model requirements of reference model components for the development of the technical system are able to be forwarded by accessing the digital twin, the reference model requirements containing statements about required properties and capabilities of the reference system components that the reference system components have to meet in order to comply with text-based document specifications, standards and/or specifications and provide certain performances, or containing statements about required properties and capabilities of the technical reference system that the technical reference system has to meet in order to comply with text-based document specifications, standards and/or specifications and provide certain performances, having a control device and an input/output interface connected to the control device for user inputs and outputs, wherein the control device for system development is connected to a database for storing the digital twin, and a computer program product stored in non-volatile readable memory and comprising commands for performing, the method as claimed in claim 1.

* * * * *